United States Patent [19]
Nakada et al.

[11] 3,866,588
[45] Feb. 18, 1975

[54] DEVICE FOR SUPPLYING SECONDARY AIR TO A GAS ENGINE INTAKE MANIFOLD

[75] Inventors: Masahiko Nakada; Takehiko Maekawa; Hirofumi Matsumoto, all of Toyota, Japan

[73] Assignee: Toyota Jidosha Kogyo Kabushiki Kaisha, Aichi-ken, Japan

[22] Filed: Oct. 27, 1972

[21] Appl. No.: 301,266

[30] Foreign Application Priority Data
Apr. 28, 1972 Japan.................................. 47-42279

[52] U.S. Cl........ 123/124 R, 123/97 B, 123/119 D, 123/124 A, 123/124 B, 137/480
[51] Int. Cl. ... F02m 7/00, F02m 23/04, F02d 33/02
[58] Field of Search ......... 123/97 B, 124 B, 124 A, 123/124 R, 119 D, 119 DB; 137/480

[56] References Cited
UNITED STATES PATENTS
| | | | |
|---|---|---|---|
| 3,043,286 | 7/1962 | Blomberg | 123/124 B |
| 3,374,991 | 3/1968 | Walker | 123/124 B X |
| 3,661,367 | 5/1972 | Mennesson | 123/97 B |
| 3,698,371 | 10/1972 | Mitsuyama | 123/97 B X |
| 3,707,954 | 1/1973 | Nakada et al. | 123/97 B X |

*Primary Examiner*—Wendell E. Burns
*Attorney, Agent, or Firm*—Toren, McGeady and Stanger

[57] ABSTRACT

In a device operated in response to the pressure in the intake manifold of a gasoline engine, the interior of a housing is divided into an air chamber and a pair of vacuum compartments separated by a diaphragm. The vacuum compartments are connected by a small opening through the diaphragm. One of the vacuum compartments is connected to the intake manifold. A valve is mounted within the housing for regulating flow of atmospheric air through the air chamber to the intake manifold. The valve is connected to the diaphragm and variations in the pressure within the two compartments results in a displacement of the valve for changing the flow of secondary air into the intake manifold. In addition to the intake manifold pressure other engine conditions can be checked and used for supplying the secondary air.

10 Claims, 7 Drawing Figures

3,866,588

3,866,588

DEVICE FOR SUPPLYING SECONDARY AIR TO A GAS ENGINE INTAKE MANIFOLD

BACKGROUND OF THE INVENTION

The present invention is directed to a gasoline engine having at least one carburetor and, more particularly, it concerns a device for supplying secondary air into the intake manifold of the engine.

Liquid fuel is present in the intake manifold of a gasoline engine, and the amount of the liquid fuel depends on the operating conditions of the engine and whether the engine is in a cold or warmed-up state. When the operating speed of the engine is reduced or when its load is lowered, the negative pressure in the intake manifold increases compared to the previous operating condition, and as a consequence, the liquid fuel in the intake manifold is rapidly vaporized by an amount corresponding to the incremental change in the negative pressure. As a result, the fuel-air mixture becomes enriched and causes an increase in carbon monoxide and hydrocarbons in the exhaust gases. When an engine is still being warmed-up, a considerable amount of liquid fuel is present in the manifold and, in such a case, increased amounts of carbon monoxide and hydrocarbons are discharged with the rise in the negative pressure in the manifold.

SUMMARY OF THE INVENTION

The primary object of the present invention is to decrease significantly the quantities of carbon monoxide and hydrocarbons discharged when the negative pressure in the manifold increases.

In accordance with the present invention, the amount of secondary air supplied to the intake manifold is based on the extent to which the engine is warmed-up and the variation of the negative pressure in the manifold so that the fuel mixture supplied to the engine has a proper air-fuel ratio.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
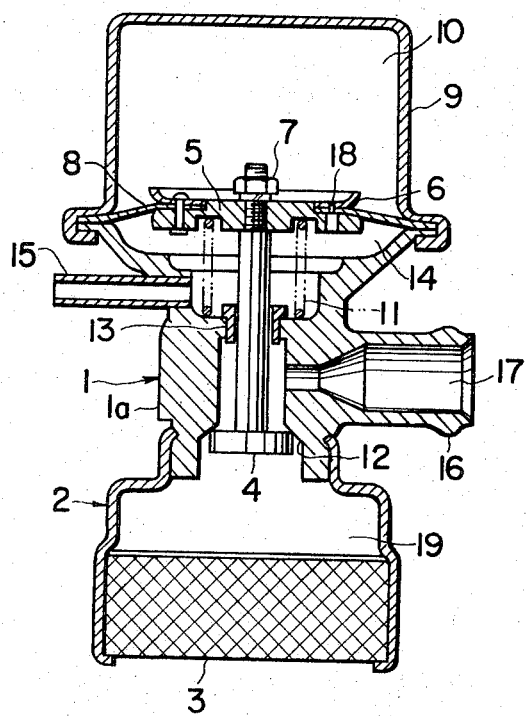
FIG. 1 is a vertical sectional view of a secondary air supply device constructed in accordance with the present invention.

In FIG. 1 a device 1 for supplying secondary air into the intake manifold of a gasoline engine is shown and includes a body member 1a forming a flow passageway with a cover 2 connected to the lower end of the body member and a cylindrically-shaped member 9 secured to the upper end of the body member. The lower end of the cover 2 is open and contains an air cleaner element 3. A valve 4 is positioned within the passageway in the body member 1a and its upper end is secured to a spring holder 5 and a diaphragm holder 6 by means of a nut 7. An annular-shaped rubber diaphragm 8 is secured about its radially inner edge between the spring holder 5 and the diaphragm holder 6 and its radially outer edge is secured between the cylindrically shaped member 9 and the upper edge of the body member 1a. The interior of the housing of the device formed by the combination of the body member 1a, the cover 2 and the cylindrically shaped member 3, is divided into an air cleaner chamber 19 in the lower part of the device with the upper part of the housing dividing its interior into an upper vacuum chamber 10 and a space 14 separated from the vacuum chamber by the diaphragm 8 along with the spring holder 5 and diaphragm holder 6. The vacuum chamber 10 has a certain predetermined capacity.

Within the space 14, a spring is positioned extending between the body member 1a at its lower end and the spring holder 5 at its upper end. The spring 11 biases the diaphragm arrangement separating the space 14 from the vacuum chamber 10 in the upward direction so that the valve is pressed against a valve seat 12 formed in the flow passageway through the air cleaner chamber 19. The air chamber 19 formed by the cover 2 and the body member 1a is separated from the space 14 by a valve guide 13 positioned about an intermediate part of the valve 4.

A connecting pipe 15 is secured into the body member 1a and opens into the space 14, the opposite end of the pipe is connected to the intake manifold of the engine by a rubber hose or similar means. An air discharge port 17 is located in the body member 1a above the valve seat 12 so that flow through the discharge port is regulated by the position of the valve 4 relative to the valve seat 12. The discharge port 17 is formed by a discharge pipe 16 extending outwardly from the body member 1a and the discharge pipe 16 can be connected to the intake manifold through a rubber hose or similar manner. Extending through the spring holder 5, the diaphragm 8, and the diaphragm holder 6, is a small opening 18 which communicates between the vacuum chamber 10 above the diaphragm and the space 14 below the diaphragm.

Figure 2:
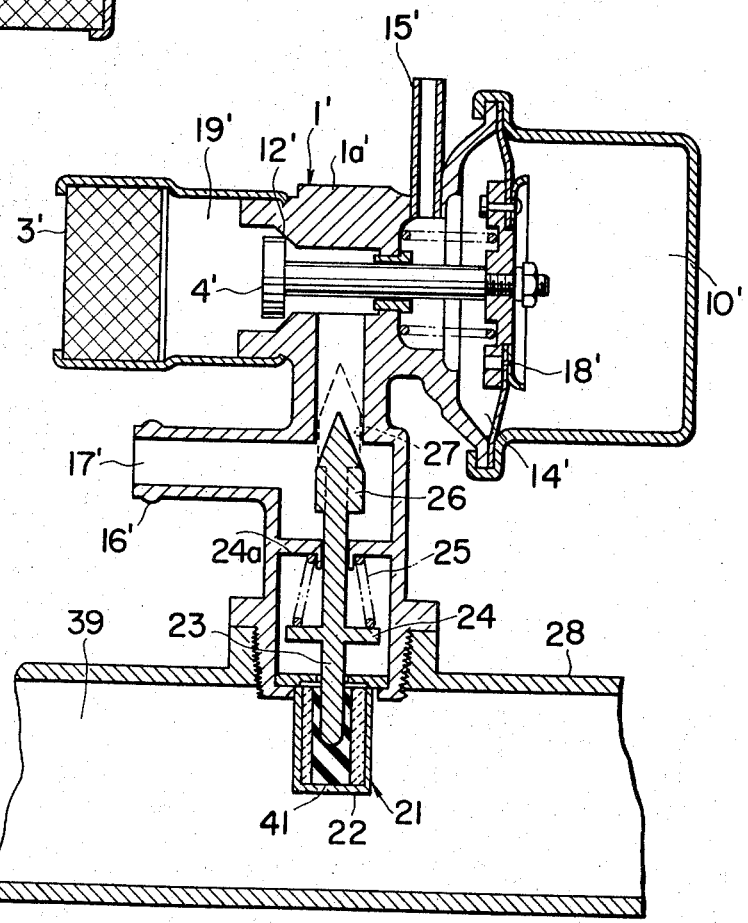
FIG. 2 is a vertical sectional view of another embodiment of the device incorporating the present invention.

In FIG. 2 another device 1', similar basically to the device 1 in FIG. 1, provides an additional regulation for flow from the air chamber 19' through the discharge port 17' to the intake manifold. While in FIG. 1 the device is shown positioned vertically, in FIG. 2 its axis extends horizontally. Below the device, a housing element 21 is filled with wax 22 and a resilient material 41 and the end of a shaft 23 is embedded within the resilient material. The housing element 21 is spaced opposite the air discharge port 17' from the device 1'. The shaft 23 extends upwardly from the resilient material 41 into the passageway connecting the air chamber 19' to the air discharge port 17'. Above the resilient material and below the air discharge port, a holder 24 extends transversely outwardly from the shaft 23. A spring 25 is located about the shaft 23 with one end contacting the holder 24 and the other end bearing against a surface 24a of the device. The spring 25 biases the shaft 23 in the downward direction as viewed in FIG. 2, into the resilient material 41. The upper end of the shaft 23 is provided with a conically shaped needle valve 26 which, as shown by the dashed outline in FIG. 2, is movably displaceable into the flow passage connecting the air chamber 19' to the air discharge port 17'. The needle valve 26 seats, within the flow passageway, against a valve seat 27 so that, depending on its position, the cross sectional flow area from the flow passageway into the discharge port 17' can be varied. The discharge port 17' is defined by a discharge pipe 16' which can be connected to the intake manifold of the engine by means of a rubber hose or the like. The housing element 21 extends into the path of engine cooling water 39 flowing through a radiator suction cylinder 28. The remaining structural arrangement of the device 1' is similar to the device 1 and similar reference numerals with a prime designation are used for indicating the similar parts.

Figure 3:
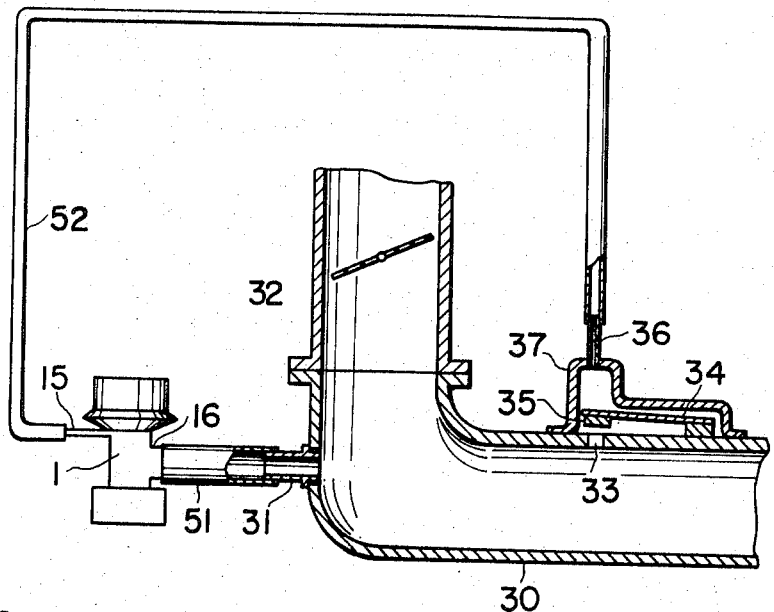
FIG. 3 is a schematic illustration of a fuel system incorporating the device of FIG. 1.
Figure 4:
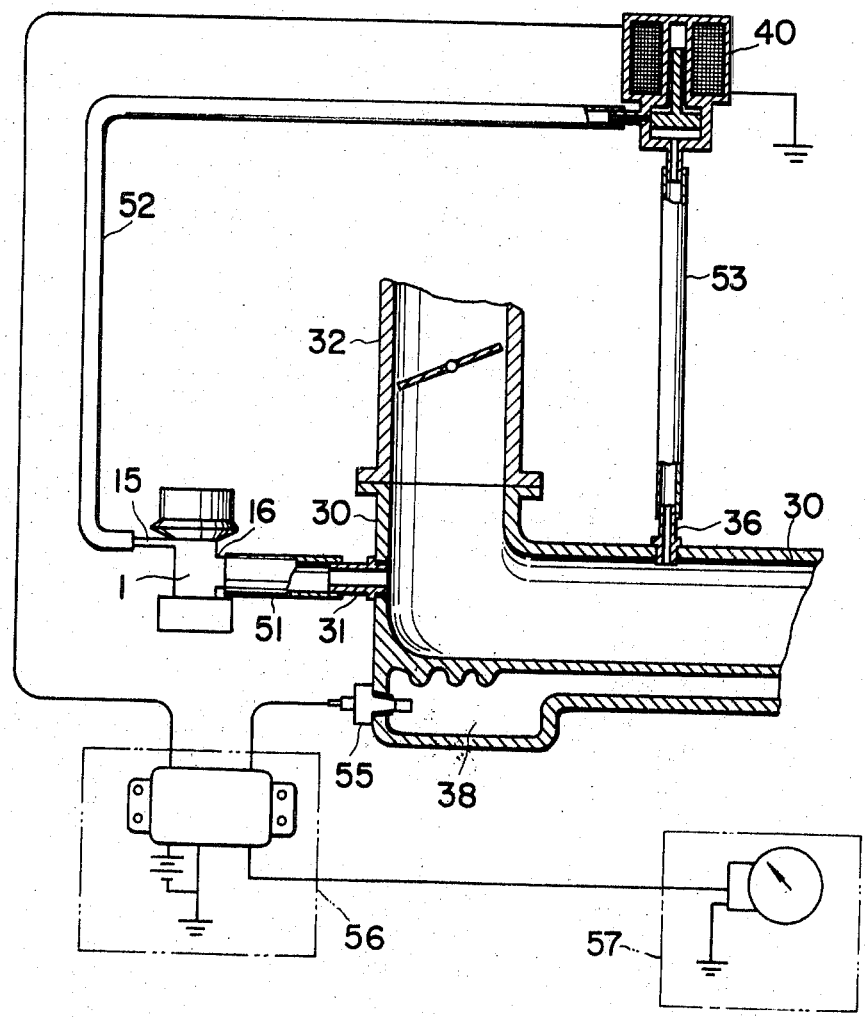
FIG. 4 is another schematic illustration setting forth a modified form of the fuel system disclosed in FIG. 3.

In FIGS. 3 and 4 a pair of fuel systems are shown which incorporate the secondary air supply device 1, as shown in FIG. 1. In FIG. 3 the discharge pipe 16 is connected by a rubber hose 51 to an air induction pipe 31 fitted into the intake manifold 30 of the engine. Another rubber hose 52 or similar member connects the connecting pipe 15 to a vacuum conduction pipe 36 connected into a temperature responsive valve 37 mounted on the intake manifold 30. A small aperture 33 in the manifold provides communication between its interior and the interior of the valve 37. Positioned within the valve 37 is a bimetallic element 34 with a valve seat 35 on its free end and the valve seat is positioned opposite the aperture 33 so that it can provide a closure for the aperture.

In the system shown in FIG. 4, the connecting pipe 16 is also joined by the rubber hose 51 and the air induction pipe 31 to the intake manifold 30. However, the connecting pipe 15 is joined by the rubber hose 52 to a magnet valve 40 which, in turn, is connected through the rubber hose 53 to the vacuum conduction pipe 36 connected directly into the manifold 30. Along the lower side of the intake manifold 30, as viewed in FIG. 4, a water jacket 38 is arranged to which the engine cooling water is supplied. Additionally, the system in FIG. 4 includes a temperature detector 55 mounted in the water jacket 38 and the detector is electrically connected to an electronic control unit 56. In addition, the electronic control unit is connected to a vehicle speed detector 57. Although in this embodiment the control unit 56 is connected to a speed meter, it is also possible to detect the vehiclel speed directly from the transmission or from the rotation of the driving shaft. The speed detector 57 is electrically connected to the electronic control unit 56. For an explanation of the operation of the electronic control unit 56, reference is made to U.S. Pat. No. 3,603,298 issued Sept. 7, 1971 to Toda et al. and also to the "Toyota Emission Control Trouble Shooting Manual," 1971 Model, Toyota Motor Sales Company, Ltd., pages 33, 38 and 39.

Figure 5:
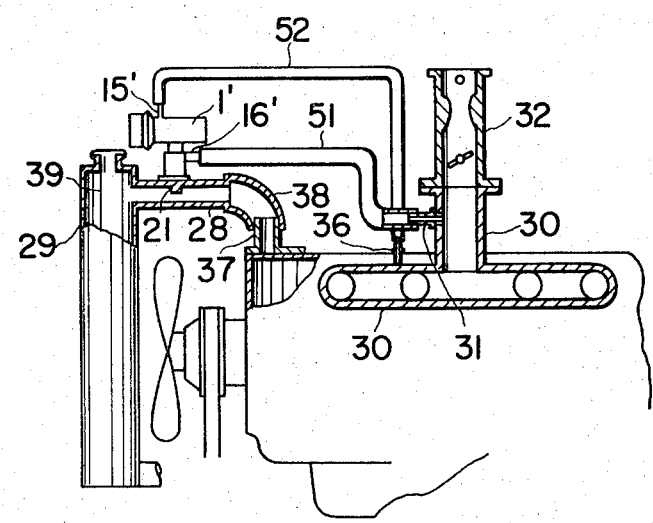
FIG. 5 is a schematic illustration of a fuel system employing the device illustrated in FIG. 2.

In FIG. 5 another fuel system is shown which utilizes the secondary air supply device 1' illustrated in FIG. 2. In FIG. 5, an engine cooling water discharge port 37 is connected by a rubber hose 38 to a cooling water intake port 28 for a radiator 29. The housing element 21 of the device 1' is mounted in the intake port 28 so that the housing element is contacted by the cooling water 39 as it flows through the intake port 28 into the radiator 29. Further, the discharge pipe 16' is connected by means of a rubber hose 51 to the air induction pipe 31 of the engine intake manifold 30. The connecting pipe 15 is joined by the rubber hose 52 to the vacuum conduction pipe 36 mounted in the intake manifold.

The device 1, illustrated in FIG. 1, operates in the following manner. When the engine is operating under certain given conditions, the pressure in the space 14 remains equal to the negative pressure of the manifold since the connecting pipe is in direct communication with the intake manifold and the pressure in the vacuum chamber 10 remains equal to the negative pressure in the manifold since the vacuum chamber 10 communicates directly with the space 14 through the opening 18. If the engine load is reduced or the engine load is changed into a reduced-speed condition from the normal condition where the pressure in the chambers is equal, the pressure in the space 14 immediately changes to the negative pressure in the manifold, however, the pressure in the vacuum chamber cannot change as quickly because the opening 18 is small and, as a consequence, a pressure differential occurs between the upper or vacuum chamber side of the diaphragm 8 and the lower or space 14 side and the difference causes the diaphragm to move downwardly, that is toward the space 14. Accordingly, the valve 4 fixed to the diaphragm is displaced from the position shown in FIG. 1 until its position is balanced by the reactive force of the spring 11. As a result, the valve 4 is spaced from the valve seat 12 opening the flow passage through the air chamber 19 for admitting air into the air discharge port 17. Subsequently, with the passage of time, the pressure in the vacuum chamber gradually changes to the level of the pressure in the space 14 through the opening 18 and the pressure differences between the vacuum chamber and the space reduces with a corresponding closing of the space between the valve 4 and the valve seat 12. When the difference in pressure between the vacuum chamber 10 and the space 14 disappears, the spring again presses the valve against the valve seat 12 and shuts off the flow of air through the chamber 19 into the discharge port 17.

The greater the rate of increase of negative pressure of the manifold, the greater will be the pressure difference between the opposite sides of the diaphragm with a corresponding spacing between the valve 4 and the valve seat 12. Moreover, it will take a longer period of time for the valve to again become pressed against the valve seat 12 by the spring 11. Therefore, the action of the valve 4 is varied in accordance with the manner in which the negative pressure of the manifold changes.

In the adaptation of the device illustrated in FIG. 1 to the fuel system of an automobile engine, as shown in FIG. 3, the operation of the arrangement is as follows, when the engine is still warming up and has not reached normal operating conditions, the valve seat 35 remains in spaced relationship from the opening 33 into the intake manifold 30 due to the action of the bimetallic element 34 and the negative pressure within the manifold is transferred into the space 14 in the device 1 through the vacuum conduction pipe 36, the rubbeer hose 52 and the connecting pipe 15. With the rise of the negative pressure within the manifold a pressure differential is developed between the space 14 and the vacuum chamber 10 and the valve 4 is displaced from its valve seat 12 permitting flow of air from the chamber 19 into the discharge port 17. With the flow open into the discharge port 17, the intake manifold sucks air through the air cleaner element 3 through the air chamber 19 and the discharge port 17 into the rubber hose 51 and finally through the air induction pipe 31 into the manifold 30. As the engine warms up to the requisite level for normal operations, the temperature in the intake manifold 30 also increases and effects a decrease in the quantity of liquid fuel in the intake manifold, accordingly, even if the negative pressure in the manifold increases, there is no problem with the fuel mixture becoming excessively rich.

Under such a situation, the increased temperature acting on the bimetallic element 34 causes it to displace the valve seat 35 across the opening 33 in the intake manifold 30. Therefore, the pressure in the manifold is not transmitted to the device 1 and it becomes inoperatiave with no air being supplied through it to the intake manifold. In this manner, secondary air is supplied to the intake manifold corresponding to variations in the negative pressure in the manifold as the engine is warmed up.

In FIG. 4 another arrangement is shown of the device 1 in an automobile fuel system. In this arrangement, in place of the temperature responsive valve 37 used in the system in FIG. 3, a magnet valve 40 is used to control flow between the intake manifold 30 and the space 14. The magnet valve 40 is operated in accordance with the temperature of the cooling water within the water jacket 38 located below the intake manifold 30. The temperature detector 55 checks the temperature of the cooling water and when its temperature is sufficiently high with the engine warmed up for operating under normal conditions, the control unit 56 is actuated to cut-off the supply of current to the magnet valve so that the negative pressure of the manifold is not transmitted into the space 14 in the device 1. In situations where the speed detector 57, or the temperature detector 55 determine a certain set of conditions which would effect the fuel air mixture, the magnet valve is opened and the device operates in the same manner as described for the system shown in FIG. 3. Therefore, secondary air is supplied into the intake manifold based on the warmed up condition of the engine, the speed of the vehicle, and the change in the negative pressure in the manifold. When the device 1', shown in FIG. 2, is used, and the temperature of the engine cooling water 35 rises, the temperature is transmitted through the housing element 21 and melts the wax 22 causing it to expand in volume and compressing the resilient member. As the resilient member is compressed by the wax, it pushes the shaft in the upward direction, as viewed in FIG. 2. When the cooling water temperature drops, there is a corresponding reduction in the volume of the wax 22 and the pressing action on the resilient member 41 is relieved, permitting the shaft 23 to drop downwardly at its lower end into the housing element 21. The upward and downward movement of the shaft 23 controls the position of the needle valve 26 relative to the valve seat 27. Accordingly, as the temperature of the cooling water increases, the gap between the valve seat and the needle valve decreases until the gap or opening is completely closed similarly, as the temperature of the cooling drops, the valve 26 recedes from the valve seat 27 permitting flow from the air chamber 19' into the discharge port 17'. Therefore, in addition to the regulation of the flow from the air chamber 19' into the discharge port 17' provided by the valve 4' there is the superposed regulation of the valve 26 which varies the cross sectional flow area to the discharge port 17 in accordance with the temperature of the cooling water.

In FIG. 5 a fuel system is shown in which the device 1' of FIG. 2 is employed in the operation of an automobile engine. In this system, the connecting pipe 15' is conneccted directly to the intake manifold 30 by the rubber hose 52 and the negative pressure of the manifold is applied to the space 14' in the device in the same manner as when the temperature responsive valve 37 is opened in FIG. 3. When the engine has not warmed up, the temperature of the cooling water 39 is low and the needle valve 26 is spaced from its valve seat 27 due to the action of the materials within the housing element 21 on the shaft 23 of the valve. However, as the engine gradually warms up, there is a corresponding increase in the temperature of the cooling water so that the wax 22 in the housing element 21 melts and expands causing the shaft 23 and the valve 26 to move into the closed position with the valve seat 27. When the valve 4' within the device 1' is separated from the valve seat 12', air flows into the intake manifold through the air cleaner element 3', the air chamber 19', the gap between the needle valve 26 and its valve seat 27 and the air discharge port 17' so that an amount of secondary air is supplied into the intake manifold in accordance with the temperature conditions of the engine.

From the above description it will be apparent in the case of the arrangement in FIG. 3, that the extent to which the engine has been warmed up is determined by the temperature responsive valve 37 which is of a simple construction, and a suitable amount of secondary air is supplied to the intake manifold in accordance with the rise in the negative pressure of the manifold only during the period when the engine is cold, that is, has not warmed up to a particular level. Therefore, an optimum airfuel ratio is supplied to the engine at all times for attaining maximum purification of the exhaust gases.

Although the manner in which the fuel system illustrated in FIG. 4 operates is substantially the same as for the system shown in FIG. 3, the accuracy of detecting the manner in which the engine has warmed up is enhanced and the operation of the device becomes more steady and reliable due to the use of the magnet valve 40. Therefore, under operating conditions where no secondary air is required, such as during starting or idling of the engine or during low-speed operation or where the secondary air could cause malfunctioning of the engine, no supply of secondary air is provided. Accordingly, a better cleaning of the exhaust gases is achieved and smoother and more steady operation of the engine is obtained.

In the system disclosed in FIG. 5, though the secondary air supply operation is substantially the same as in FIG. 3, it is possible to vary the cross-sectional area of the flow path to the discharge port 17' based on the temperature conditions of the engine, so that an optimum amount of secondary air is supplied to afford better cleaning of the exhaust gases.

Figure 6:
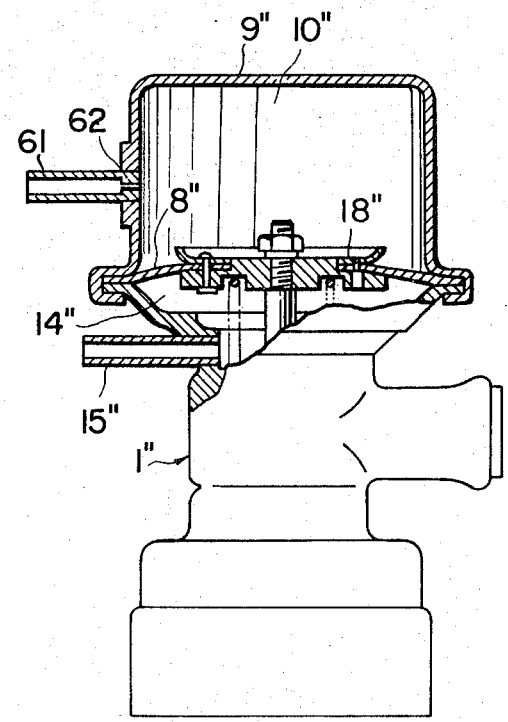
FIG. 6 is a view, partly in section, showing an alternate arrangement of the embodiment disclosed in FIG. 1.
Figure 7:
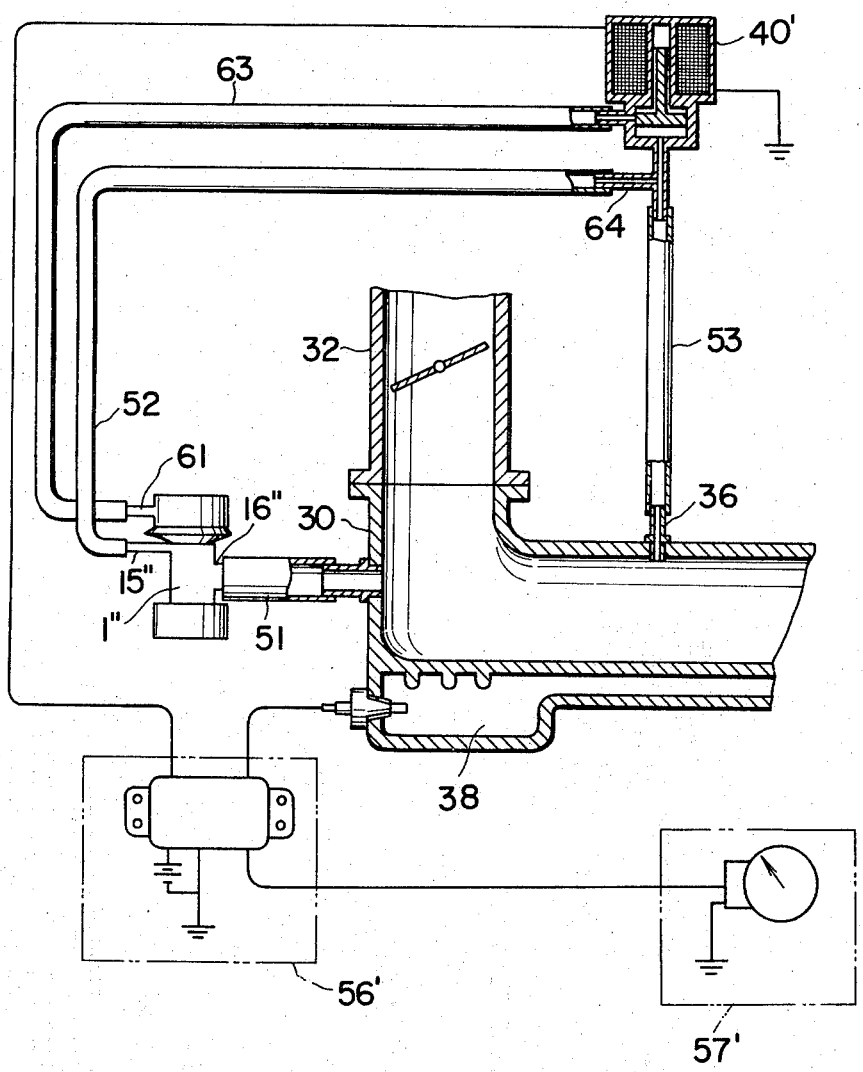
FIG. 7 is a schematic illustration of a fuel system incorporating the device illustrated in FIG. 6.

In still another embodiment of the present invention, as shown in FIG. 6, the device 1″ is similar to that disclosed in FIG. 1, however, a restriction 62 is provided in the cylindrically shaped member 9″ communicating with the vacuum chamber 10″ and a pressure induction pipe 61 projects outwardly from the restriction. In FIG. 7, the device 1″ is shown in a fuel system for an engine with the restriction 62 and the connecting pipe 15′ both being connected to the intake manifold through a conduit system containing a magnet valve 40′. The vacuum conduction pipe 36 is connected to the intake manifold 30 and a rubber hose 53 extends from the pipe 36 to the magnet valve 40′. The pressure induction pipe 61 connected to the restriction 62 is joined to a rubber hose 63 which connects it to the magnet valve 40′. Further, the connecting pipe 15″ from the space 14″ is connected through the rubber hose 52 to a branch pipe 64 connected into the rubber hose 53 intermediate its ends connected to the magnet valve 40 and the vacuum conduction pipe 36. With these differences, the device 1″ is the same as that shown in FIGS. 1 and 4.

In the operation of the embodiment shown in FIG. 6, when the temperature of the cooling water is high and the engine is in a sufficiently warmed up condition, or when the vehicle is at a standstill with the engine idling, or when the speed of the vehicle detected by the speed detector 57 is low and the vehicle is operating at an extremely low speed, the electronic control circuit 56′ provides a flow of electric current to the magnet valve 40′ to open it and supply the negative pressure from the manifold through the hose 63, the pressure induction pipe 61 and the restriction 62 into the vacuum chamber 10″. In any other operating situation of the engine, the electronic control circuit 56′ does not actuate the magnet valve 40′ and the negative pressure from the manifold is not supplied into the vacuum chamber 10″.

When the magnet valve 40′ is closed, the negative pressure of the manifold is only in communication with the space 14″ through the rubber hose 53, the branch pipe 64, the rubber hose 52 and the connecting pipe 15″. Therefore, the operation of this embodiment is the same as that described for the arrangement in FIG. 3 when the engine has not been sufficiently warmed up. When the magnet valve 40′ is open, the negative pressure from the manifold is introduced not only into the space 14″ but also into the vacuum chamber 10″, however, the change in the negative pressure in the vacuum chamber 10″ changes more slowly than in the space 14″ due to the restriction 62 through which flow passes into the vacuum chamber. Consequently, a pressure difference develops between the opposite sides of the diaphragm 8″. Because the extent of the pressure difference is smaller between the vacuum chamber 10″ and the space 14″ than when the magnet valve 40′ is closed and also because the air in the vacuum chamber 10′ escapes passing through both the small opening 18″ and the restriction 62, the time required until the pressure on both sides of the diaphragm reaches equilibrium is shortened.

Accordingly, based on the above described embodiment, the movement of the valve controlling flow through the air chamber is smaller and takes place more quickly after the engine has warmed up or when the engine is idling or when the engine is running at low speed and, as a result, the amount of secondary air supplied to the intake manifold is decreased. The characteristic features achieved in this embodiment are as follows. In certain cases, depending on the type of engine, it is necessary in reducing carbon monoxide and hydrocarbons in the exhaust gases to supply secondary air when the negative pressure is high, even after the engine has warmed up to a particular level or during idling or low-speed running of the engine. The amount of secondary air required in such a case may be smaller than that needed when the engine is operated and is not sufficiently warmed up. Actually, it is necessary to reduce the amount of the secondary air to some extent for maintaining the engine performance from being adversely affected. The embodiment shown in FIG. 6 and its practical adaptation as illustrated in FIG. 7, are particularly suited for use in the case just described for effectively suppressing the generation of carbon monoxide and hydrocarbons in exhaust gases and for maintaining high engine performance.

As mentioned above, the various embodiments of the invention shown in FIGS. 1, 2, and 6 are capable not only of reducing carbon monoxide and hydrocarbons which otherwise would be released in considerable amounts during periods of high negative pressure in the manifold, but also prevents misfiring of the engine, so that it is possible by means of these embodiments to prevent after-burn in the exhaustion system.

While specific embodiments of the invention have been shown and described in detail to illustrate the application of the inventive principles, it will be understood that the invention may be embodied otherwise without departing from such principles.

What is claimed is:

1. In a gasoline engine including a carburetor, a device for supplying secondary air into the intake manifold of said engine, said device comprising a housing, means dividing the interior of said housing into a vacuum chamber and a space adjacent to and separated from said vacuum chamber, an air chamber containing secondary air to be supplied to said intake manifold, a small opening defined to extend completely through said means dividing the interior of said housing and establishing flow communication between said vacuum chamber and said space, first conduit means in communicataion with said air chamber for connecting said air chamber to said intake manifold, displaceable means within said air chamber for selectively admitting and blocking flow to said first conduit means, a connection in said housing opening into said space, second conduit means in communication with said connection in said housing opening into said space for connecting said space to said intake manifold, and means responsive to the operating conditions of said engine and associated with said second conduit means for admitting and blocking flow through said second conduit means to said space based upon the operating conditions of said engine, said displaceable means being arranged to selectively admit and block flow to said first conduit means in accordance with the blocking and admitting of flow to said space through said second conduit means by said means responsive to the operating conditions of said engine.

2. In a gasoline engine, as set forth in claim 1, including a movably positionable valve means located in the path of flow of the secondary air from said air chamber into said first conduit means downstream of said displaceable means within said air chamber for varying the cross-sectional flow area of flow of the secondary air passing to the intake manifold.

3. In a gasoline engine, as set forth in claim 2, including means associated with said movably positionable valve means for effecting the positioning of said valve means in accordance with temperature conditions associated with the engine.

4. In a gasoline engine, as set forth in claim 2, wherein said valve means comprises a passageway connected to said air chamber and said first conduit means, a valve member movably positionable within said passageway and having a variably shaped cross section transversely of the axial direction of said passageway for varying the cross sectional flow area therethrough and for closing off flow through said passageway, and spring means for biasing said valve member into the open position.

5. In a gasoline engine, as set forth in claim 4, wherein temperature responsive means are associated with said valve member and are arranged to be actuated by a temperature condition determined by the running condition of the engine.

6. In a gasoline engine, as set forth in claim 5, wherein a shaft is connected to and extends axially from said valve member, a housing enclosing the end of said shaft spaced from said valve member, a resilient material within said housing and embedding the end of said shaft, and a material positioned within said housing in contact with said resilient material which expands and contracts in response to heat for axially displacing said valve member.

7. In a gasoline engine, as set forth in claim 6, wherein said valve member is conically shaped in the axial direction for varying the flow area through said passageway.

8. In a gasoline engine, as set forth in claim 1, wherein said housing comprises a body member having an axially extending passageway therethrough, a cover attached to one end of said body member and defining an opening into said housing, said cover and said body member combining to form the air chamber, an air cleaner element positioned within the opening formed by said cover, and a cylindrically shaped member attached to the opposite end of said body member and defining in part the vacuum chamber in said housing.

9. In a gasoline engine, as set forth in claim 8, wherein said means dividing the interior of said housing comprises a diaphragm connected between said body member and said cylindrically shaped member and extending across said housing defining the separation between the vacuum chamber and the space adjoining the vacuum chamber.

10. In a gasoline engine, as set forth in claim 9, wherein said displaceable means within the air chamber comprises a shaft connected at one end to said means connected between said body member and said cylindrically shaped member and extends therefrom through the space adjoining the vacuum chamber into the air chamber, a valve member positioned on said shaft within the air chamber and arranged to form a closure of the flow path through the air chamber, and a spring positioned in the space adjoining the vacuum chamber for biasing said valve member into position for closing off flow through the air chamber.

* * * * *